United States Patent [19]

Weiss

[11] 4,103,931
[45] Aug. 1, 1978

[54] EXTENSIBLE VEHICLE TRAILER WITH SAFETY LOCKING BAR AND CABLE AND HOSE SUPPORTING OUTRIGGERS

[76] Inventor: Frederick A. Weiss, 1148 Gypsy La., Towson, Md. 21204

[21] Appl. No.: 823,519

[22] Filed: Aug. 10, 1977

[51] Int. Cl.² .............................................. B62d 53/06
[52] U.S. Cl. .................................... 280/656; 280/420; 280/80 B
[58] Field of Search .............. 280/656, 638, 420, 80 B

[56] References Cited

U.S. PATENT DOCUMENTS

| 3,443,822 | 5/1969 | Weiss | 280/656 |
| 3,537,727 | 11/1970 | Tantlinger | 280/656 |
| 3,819,076 | 6/1974 | Oehler | 280/656 |

Primary Examiner—Robert R. Song
Attorney, Agent, or Firm—Mason, Fenwick & Lawrence

[57] ABSTRACT

A telescopically extensible vehicle trailer is disclosed having closely adjacent pairs of longitudinal main beams on each of the respective trailer sections with the main beams of one section disposed between and closely inwardly adjacent the main beams of the other section, and having a floating safety lock bar extending transversely between and carried by the longitudinal main beams of one of the sections cooperative with front and rear limit position stops on the other trailer section to avoid accidental separation of the sections if the conventional locking device therefor is not properly operated. A support mechanism for a coiled electrical cable and air hose system arranged to avoid long unsupported spans of cables and hoses is also disclosed.

20 Claims, 10 Drawing Figures

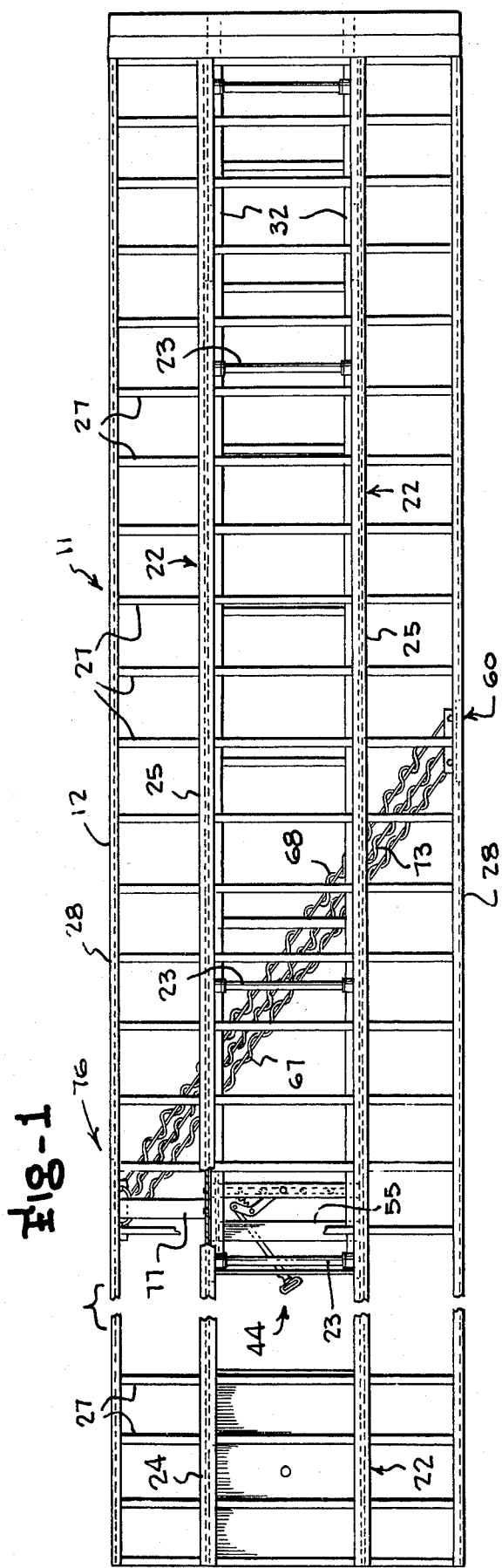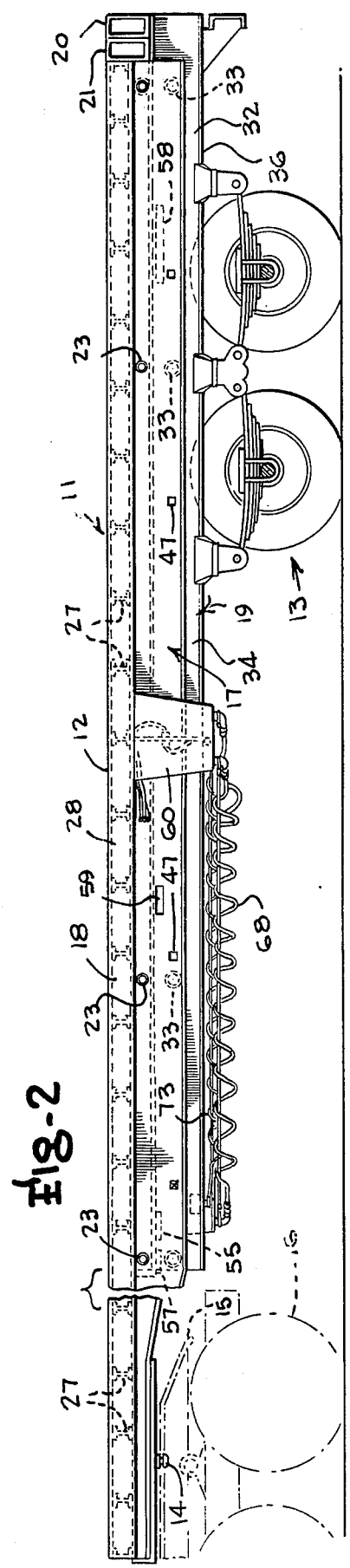

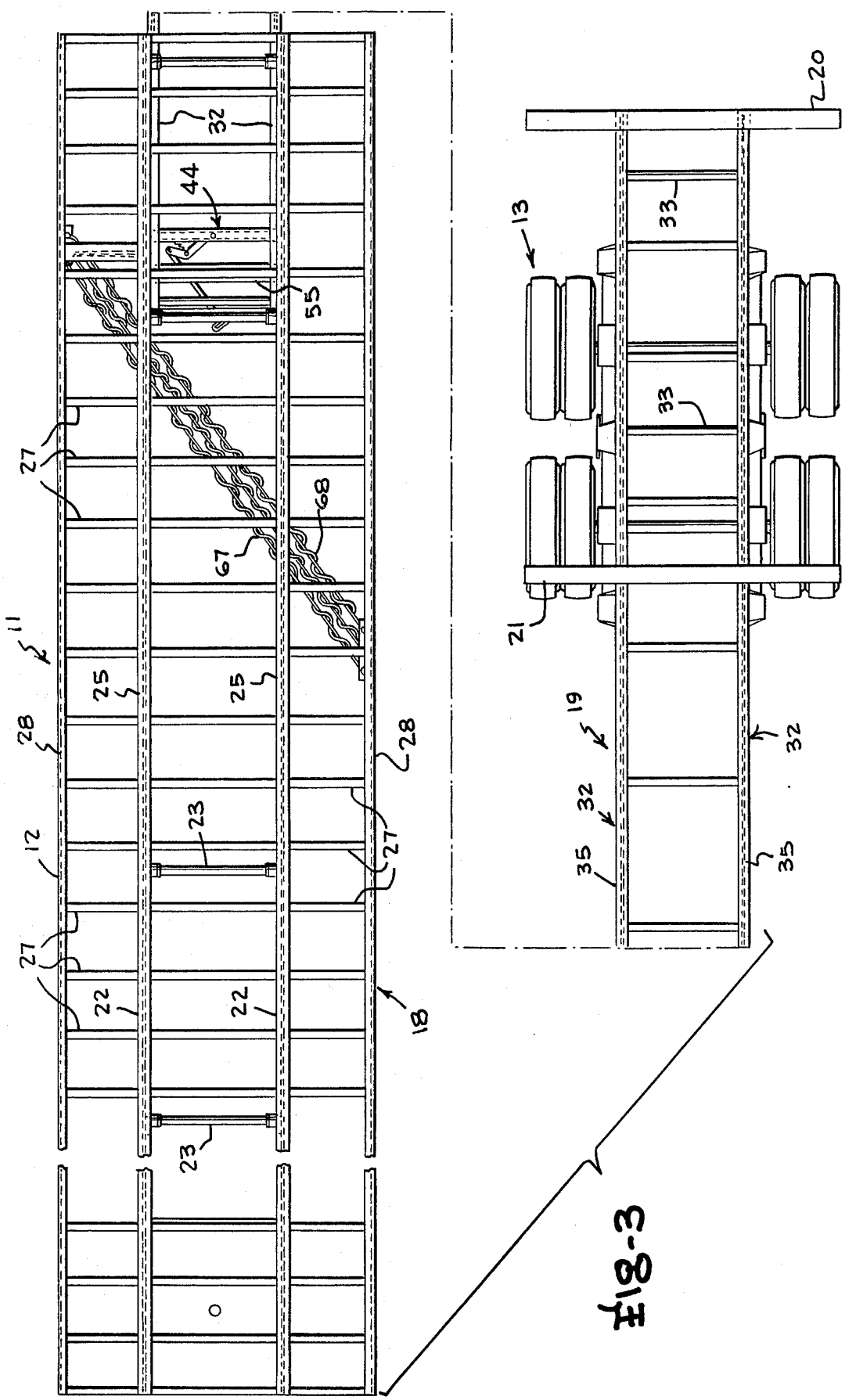

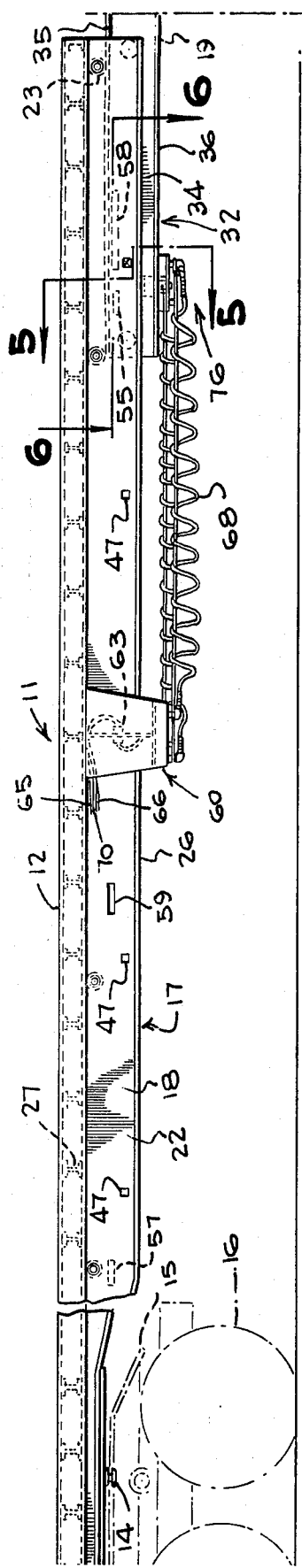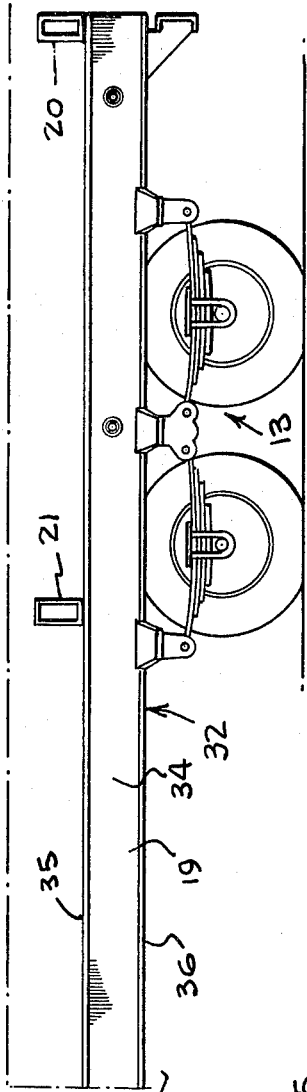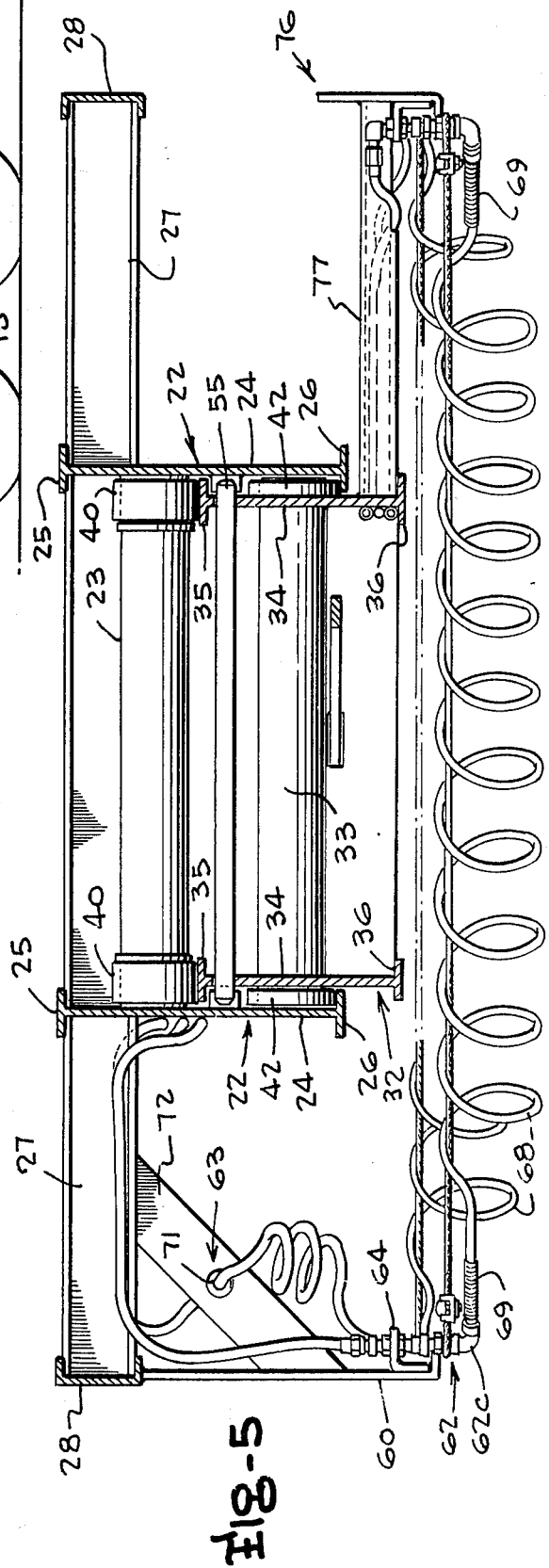
Fig-4
Fig-5

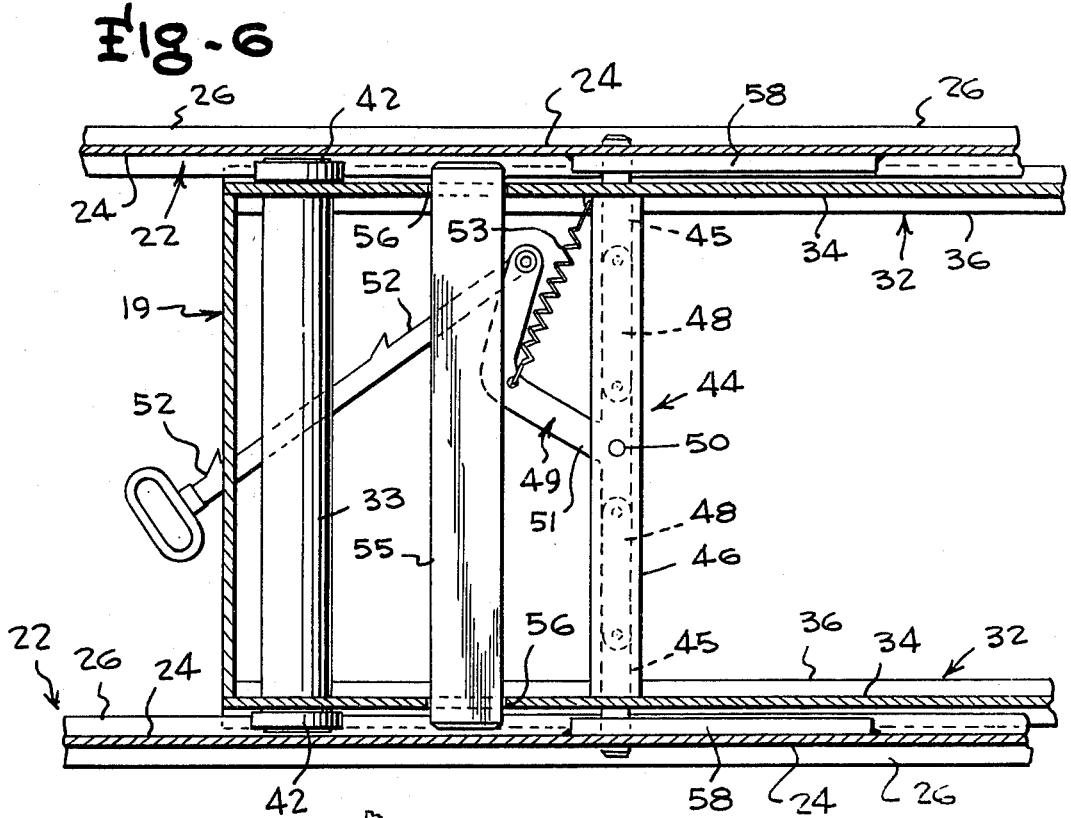
Fig-6
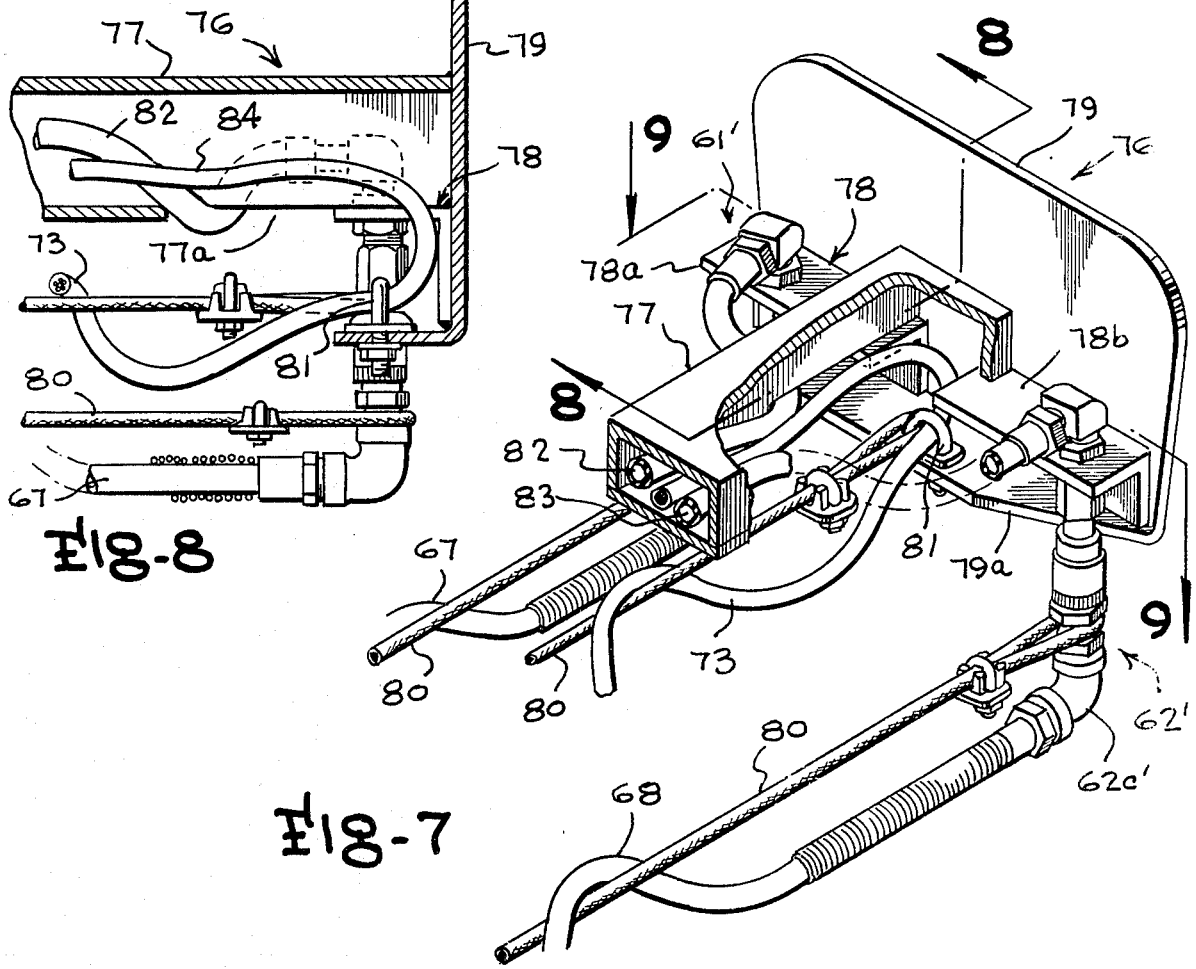
Fig-8
Fig-7

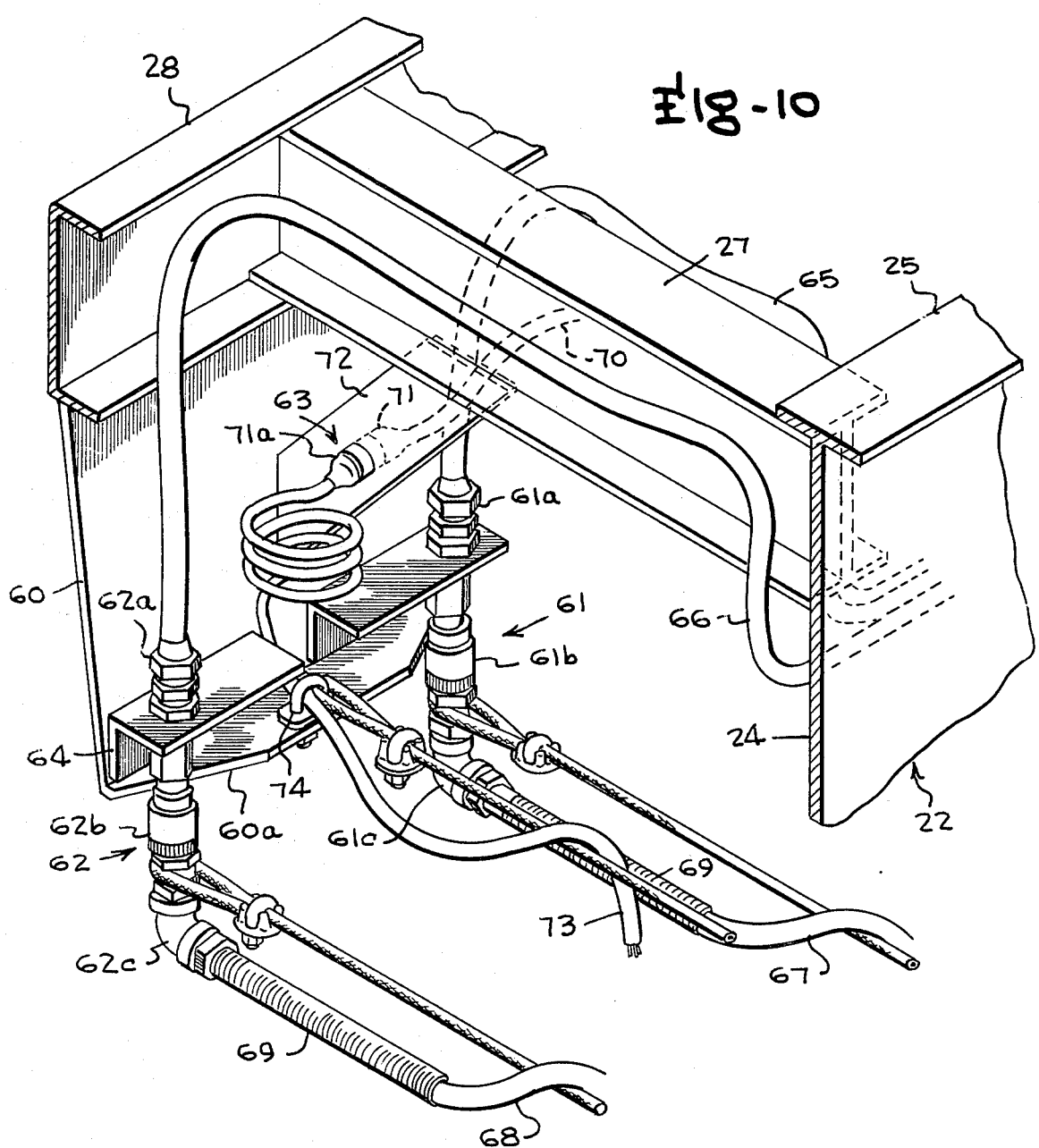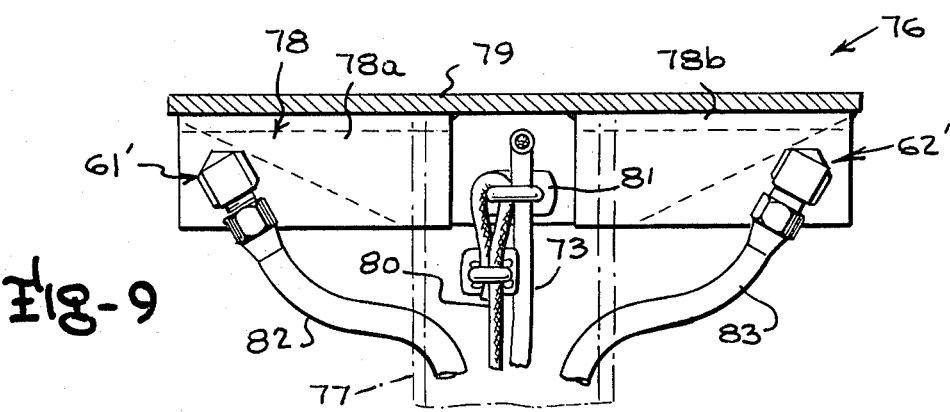

EXTENSIBLE VEHICLE TRAILER WITH SAFETY LOCKING BAR AND CABLE AND HOSE SUPPORTING OUTRIGGERS

BACKGROUND AND OBJECTS OF THE INVENTION

The present invention relates in general to extensible vehicle trailers which can be lengthened and shortened to accommodate the trailer bed to the length of loads of different lengths, and more particularly to telescopically extensible vehicle trailers having a floating safety lock bar extending transversely between and carried by longitudinal beams of one of the extensible trailer sections and cooperative with stops at front and rear limit positions on the other trailer section to avoid accidental separation of the trailer sections if the locking device is not properly operated, and to an extensible trailer construction having support mechanism for a coiled electrical cable and air hose system arranged to avoid long unsupported spans of hoses and cables.

In recent years, a large number of vehicle trailers have been designed in such a manner that the trailers can be lengthened and shortened to accommodate the trailer bed to various load lengths or to comply with load capacity or length or wheel base requirements of various States. These extensible vehicle trailers have come into popular use because of their ready adaptability to be varied in length to meet different load carrying requirements and their ability to permit variation of weight distribution in a manner to comply with different wheel base or loading requirements of different States. Examples of such trailers are disclosed in my earlier U.S. Pat. No. 3,239,724 issued Mar. 8, 1966 and No. 3,443,822, issued Mar. 13, 1969. Those extensible vehicle trailers employ roller mounted telescopic sections making up the trailer bed, formed of a pair of longitudinal main beams on one of the sections paralleling and disposed alongside a companion pair of longitudinal main beam members of the other trailer section, together with a system of rollers bearing against the top main beam flanges of the rear section and the bottom main beam flanges of the front section. A locking mechanism is provided to hold the telescopically extensible sections in selected extended or contracted positions or at a plurality of predetermined intermediate positions between the limit positions to provide a trailer bed of desired length. This enables the operator to comply with varying local regulations concerning trailer lengths and trailer loads, and to haul long material while having the handling advantage of a short trailer for short material hauling and for empty return trips.

A problem which has been encountered in connection with such telescopically extensible vehicle trailers is that in some cases, the driver does not position the locking device properly after setting the trailer to the desired length, with the result that the two trailer sections may separate entirely from each other when the driver begins to pull the trailer along the roadway. While the telescopically extensible vehicle trailers are customarily provided with locking bolt members in the longitudinal main beams of one of the relatively movable trailer sections controlled by a linkage mechanism and operating rod to be extended into any of a plurality of locking openings in the outwardly adjacent main beams of the companion trailer section, the locking rod and linkage mechanism is not always properly secured in a position maintaining the locking bolts in projected locking position, so that the hazard of the trailer components separating from each other during operation has occurred with undesirable frequency.

An object of the present invention, therefore, is the provision of a telescopically extensible vehicle trailer of the type having longitudinal main beams of one of the trailer sections outwardly adjacent and paralleling longitudinal main beams of the companion section, wherein a floating safety lock bar is carried by the longitudinal main beam of one of the extensible trailer sections to coact with portions of the other trailer section to limit the extent of longitudinal extension or contraction of the trailer and eliminate the hazard of accidental trailer separation if the locking device for locking the trailer at a plurality of different trailer length adjustments fails.

Another object of the present invention is the provision of a telescopically extensible vehicle trailer having a manually operable locking device for adjusting the trailer to a plurality of different trailer lengths and having in addition thereto a safety locking bar which floats free in the main beams of one of the trailer sections at a predetermined position and is captured between the main beams of the companion extensible trailer section together with stops at front and rear limit positions to engage the safety lock bar and prevent relative longitudinal movement of the two trailer sections beyond the maximum and minimum trailer length positions.

Another problem which has been encountered and presents significant problems in connection with extensible vehicle trailers is the provision of proper support for the electrical cables for the light system and the air hoses for the brake system, where the length of the trailer is adjustable to different trailer lengths usually covering a range of different lengths, for example involving adjustment ranges of at least 20 feet. It will be apparent upon consideration of this problem that an extensible vehicle trailer which is capable of being adjusted to a length of 20 feet or more greater than its length in the minimum or contracted position creates significant problems in preventing unacceptable or undesirable sagging of cables and hoses at the minimum length condition of the trailer if they are to be also capable of reaching the rear end of the trailer or the rear wheel assemblies when the trailer is in the fully extended position.

Another object of the present invention is the provision of a novel supporting system for coiled electrical cables and air hoses for the light and brake systems of telescopically extensible trailers, wherein the hoses and cables are supported at or very close to their normal suspended positions below the trailer beams over the full range of extension and contraction of the trailer length.

Another object of the present invention is the provision of a support system for the coiled air hoses and electrical cables for the light and brake systems of a telescopically extensible vehicle trailer, wherein the coiled air hoses and electrical cables are coiled about flexible resilient support cords and extend between swivel mounts at opposite sides of the trailer respectively secured to the two relatively extensible trailer sections to transversely span the trailer and shift during extension or contraction of the trailer from a position inclined forwardly toward one side of the trailer at about 45° to the center longitudinal axis of the trailer to a position inclined rearwardly toward that side at a similar angle to that center axis permitting the hoses and cables to accommodate to different lengths of the trailer while changing the length of the coiled cables and hoses by only a small fraction of the change in length adjustment of the trailer.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIGS. 1 and 2 are top plan and side elevation views, respectively, of a telescopically extensible trailer, in fully contracted condition, constructed in accordance with the present invention;

FIGS. 3 and 4 are fragmentary top plan and side elevation views, of the trailer in fully extended condition;

FIG. 5 is a vertical transverse section view taken along the line 5—5 of FIG. 4;

FIG. 6 is a vertical transverse section view taken along the line 6—6 of FIG. 4;

FIG. 7 is a fragmentary perspective view showing the hose and cable supporting outrigger assembly at the right hand side of the trailer, shown to enlarged scale;

FIGS. 8 and 9 are fragmentary vertical and horizontal section views respectively, taken along the lines 8—8 and 9—9 of FIGS. 7; and FIG. 10 is a fragmentary perspective view to enlarged scale showing the cable and hose outrigger support assembly at the opposite side of the trailer.

DETAILED DESCRIPTION OF A PREFERRED EMBODIMENT

Referring to the drawings, wherein like reference characters designate corresponding parts thoughout the several figures, the telescopically extensible vehicle trailer embodying the present invention, indicated generally by the reference character 11, is of the flat bed type, in the illustrated embodiment, having a flat bed 12, and is supported near its rearmost end by a wheel assembly, generally indicated at 13, herein shown as a tandem wheel mount. The forward or front end portion of the trailer 11 is provided with the usual king pin 14 for connection to the fifth wheel assembly 15 of a conventional tractor 16.

The trailer bed 12 is supported by an under frame, generally indicated at 17, made up of a front section 18, which forms the main section of the supporting frame, and a rear section 19 which is telescopically extensible longitudinally of the trailer relative to the front section 18 for telescopic movement rearwardly to lengthen the frame. The front or main section 18 carries the flat bed 12, while the rear section has a fixed bolster 20 at the rearmost end and may include one or more intermediate longitudinally movable load supporting bolsters 21 between the rearmost end of the front frame section 18 and the rearmost end of the rear frame section 19.

The forward or main section 18 of the trailer frame is formed basically of two transversely spaced, parallel longitudinal main beams 22, which are of I-beam configuration, held in parallel relation by a series of transversely extending tubular struts 23. The longitudinal main beams 22 for the front section 18 have vertical webs 24 and top and bottom flanges 25 and 26. The webs 24 are cut away at the forward end of the front section 18 in the usual manner to provide space for the tractor fifth wheel 15 when the trailer is coupled to a tractor. A plate spans the main longitudinal beams 22 on their undersides at the front to support the king pin 14.

The remainder of the supporting structure for the flat bed 12 is made up of transverse I-beams 27, in the illustrated embodiment, having their top flange flush with the top flanges of the main longitudinal support beams 22 and arranged in parallel horizontal transversely extending relation perpendicular to the axes of the main longitudinal beams 22, with their outer ends welded to channel members 28 forming the outermost longitudinal edge beams of the front section.

The rear frame section 19 is also formed of a pair of elongated, transversely spaced parallel longitudinal main beams 32 held in parallel, spaced relation by means of tubular struts 33. The main beams 32 are also of I-beam configuration having vertical webs 34 and top and bottom flanges 35, 36. The top and bottom flanges 35 and 36 in this embodiment are conventional flat horizontal flanges and the rear section main beams 32 are disposed closely adjacent to but inwardly of the main longitudinal beams 22 of the front section 18, as illustrated in FIG. 6, with the top flanges 35 of the rear section main beams 32 located at a level between the top and bottom flanges of the front section main beams 22 located just below the tubular struts 23 of the front section and the bottom flanges 36 of the rear section main beams 32 spaced downwardly from and extending beneath the bottom flanges 26 of the front section main beams 22 as illustrated. As shown, the width of the rear frame section defined by the rear section main beams 32 is slightly narrower than the front section frame formed by the main longitudinal beams 22 so that webs 34 of the rear section main beams 32 nest between the front section main longitudinal beams 22.

For ease of telescopic movement of the rear frame section 19 relative to the front section 18, the tubular struts 23 of the main section 18 and the tubular struts 33 of the rear section 19 carry roller members for rolling contact with the rails of the main longitudinal I-beams of the respective sections. The front section struts 23 have short lengths of tubing loosely fitted on their ends just inside the webs 24 of the main longitudinal beams 22, to form rollers 40 for rolling contact with the top beams 35 of the rear section I-beams 32. These rollers may be held against longitudinal movement along the tubular struts by annular stops fixed to the struts. The tubular struts 33 of the rear frame section 19 project beyond the webs of the rear section main beams 32 and their projecting outer ends carry roller sleeves 42 for rolling contact with the inwardly projecting portions of the bottom flanges 26 of the main longitudinal I-beams 22 of the front section 18. Thus, the sliding rear frame section 19 has bearing contact through rollers 42 on the bottom flanges of the main longitudinal I-beams 22 of the front section, and is held against vertical movement or tilting by rolling contact of the rollers 40 on the top flanges 35 of the longitudinal beams of the rear frame section 19.

The telescopically extensible trailer is held in selected positions of length adjustment by any of a plurality of known locking mechanisms, which for convenience of description may be like the locking mechanism illustrated and described in may earlier U.S. Pat. No. 3,443,822. That locking mechanism, indicated here by the reference character 44, comprises a pair of locking pins 45 mounted in suitable guides, for example guide tubes or channel members 46 extending between and through and fixed in the webs 34 of the rear section main beams 32 to extend into any of a plurality of locking openings 47 shaped to correspond to the cross section of the locking pins 45 to receive their end portions, and located in the webs 24 of the front section main beams 22. The locking pins 45 are slidable in the guide tube 46 which extends across the rear frame section defined by the rear section main beam 32 and through the webs 34 thereof, and are pivotally connected at their inner ends to link members 48 which are pivotally connected to the ends of an operating bell crank 49. The bell crank 49 is pivotally mounted in the tube for movement about a pivot pin 50 and has an outwardly projecting control arm 51 projecting through a slot in the tube to be controlled by an actuating rod 52 having a handle on its end and having pointed stops projecting therefrom engageable with the side of an opening in a cross bar or other stationary member transversely spanning the longitudinal beams to hold the actuating rod 52 and the bell crank connected therewith in either of a release position or a lock position to which it may be adjusted by the operator. A spring 53 connected between the bell crank 49 and a stationary anchor on the frame urges the locking mechanism to the lock position when the stop on the actuating rod for the release position is disengaged from its cooperating stationary stop surface. When the locking mechanism 44 is operated to retract the locking pins 45, the rear section 19 can be moved to extend the trailer length to any of the lengths associated with the plurality of locking openings 47 in the webs 24 of the front section longitudinal beams 22. This is normally accomplished by actuating the lock pin operating handle or rod 52 to withdraw the locking pins 45 from the locking openings 47 in the webs 24 for releasing the two sections for relative movement, and with the rear wheel brakes set, the vehicle or tractor is driven forwardly to draw the front trailer section 18 forward to elongate the frame. After the proper length has been secured, the operating handle or rod 52 is operated to allow the spring 53 to return the operating pins to locking position in the openings 47 of the front section beams 22. If desired, rather than relying simply upon the spring 53 to return the locking pins 45 to projected position in the locking openings 47, positive action can be required by shaping a stop on the operating rod 52 which is engaged against a surface of the transverse brace or frame member through which the operating rod projects to frictionally hold the operating rod in the locking position. It will also be appreciated that the bell crank member for retracting and projecting the locking pins may be disposed in a vertical plane, rather than a horizontal plane, for pivotal movement about a horizontal axis, and be controlled by an operating rod similar to the rod 52 but extending through a side of the trailer mechanism, for example through a lower portion of the web of the rear section longitudinal beam 32 carrying the locking pins, if desired.

In order to eliminate the hazard of the trailer accidentally or unintentionally separating in the event the driver has not positioned the locking mechanism properly, I provide a floating safety locking bar 55 which has a transverse length very close to but just shorter than the distance between the vertical webs 24 of the front section main longitudinal beams 22 to be captured between these vertical webs 24 in normal operation and slidably carried in a pair of transversely aligned rectangular openings 56 in the vertical webs 34 of the rear section main beams 32. The floating safety lock bar 55 is of rectangular cross section, in the illustrated embodiment, having slightly beveled end portions as illustrated, and is freely carried, in one satisfactory example, in the rectangular shaped openings 56 in the webs 34 of the rear section main longitudinal beams 32 near the front ends of the beams 32, for example located in the upper portions of the webs 34 just below the location of the top flanges 35 and spaced about 10 or 12 inches rearwardly of the front edges of the rear section main beams 32. The floating safety bar 55, when located in the openings 56 in the webs 34 of the rear main beams 32 moves between front and rear stops 57 and 58 respectively welded onto the inwardly facing surfaces of the webs 24 of the front section main beams 22 with the stops located in the forward and rearward paths of movement of the end portions of the safety locking bar 55 projecting beyond the webs 34. For example, the front floating bar stops 57 may be formed of a 4 inch long steel bar having a square cross section of 1 ¼ inch by 1 ¼ inch mounted on each of the front section main beams 22 welded against the inner surfaces of the vertical webs 24 of these main beams in the path of movement of the projecting end portions of the safety locking bar 55 located, for example about ½ inch forward of the location occupied by the floating safety locking bar 55 when the trailer is in its fully contracted or shortest condition, for example as illustrated in FIG. 2. The rear stops 58 in the illustrated embodiment are formed of bars having a square cross section of 1 ¼ inch by 1 ¼ inch and a length of 20 inches welded onto the inwardly facing surfaces of the webs 24 of the front section main beams 22 and located in the path of the end portions of the floating locking bar immediately rearwardly of the location of the floating locking bar 55 when the trailer is in the fully extended position, as illustrated in FIG. 4.. In one example, the 20 inch long rear stops 58 may be located about 63 ½ inches forwardly of the rearmost ends of the front section main beams 22.

In order to position the floating safety locking bar in captured position in the openings 56 between the webs 24 of the front section main beams 22, one opening having a cross section corresponding in shape and size to the cross section of the floating safety locking bar is provided in the vertical web 24 of one of the front section main beams 22 located at some intermediate position between the front and rear stops 57 and 58 and also preferably located between a pair of locking openings 47 in the corresponding main beam for receiving the locking pins 45 at one of the adjustable length positions for the trailer. For example, in an extensible trailer having locking pin openings 47 located to adjust the trailer over a range of lengths including 42 foot and 49 foot lengths as intermediate length examples, the insertion and removal opening 59 for the floating safety locking bar in the web 24 of the associated main beam 12 may be located about half way between the 42 foot and 49 foot locking pin openings 47. In this manner, when the trailer is adjusted to the appropriate intermediate length registering the locking bar insertion and withdrawal opening 59 with the openings 56 therefor in the webs 34, the floating safety locking bar 55 can be inserted until its distal end abuts the inner surface of the web 24 of the opposite main beam 22 and the front and rear trailer sections 18 and 19 can then be expanded or contracted to any of the positions determined by the locking pins 45 and locking openings 47, whereupon the floating safety locking bar 55 will be captured between the webs 24 of the front section main beam 22 and will travel between the front and rear stops 57 and 58 which lie in the path of the floating safety locking bar and prevent unintended extension of the trailer sections to a sufficient extent to separate them if the locking bar mechanism fails or is improperly adjusted.

In order to permit the electrical cable and air hose system of the extensible trailer to lengthen and contract with the trailer over the length adjustment range of the trailer and provide adequate support for the stretch coil sections of the cable and hose system employed to accommodate to the various trailer lengths, a special outrigger cable and hose supporting structure is provided so that the stretch coil sections of electrical cable and hoses are suspended at opposite ends in the midregion of the trailer over a distance only slightly greater than the width of the trailer. For example, assuming a trailer having the capacity to be extended over a length range of about 21 to 25 feet, the stretch coil sections of electrical cable and air hoses, transversely span the trailer over a distance of only about 12 feet rather than the approximately 24 foot span which would be required if they extended lengthwise along the longitudinal axis of the trailer.

Referring to FIG. 7–10, the customary pair of air lines or conduits connected to the tractor cab at the front end of the trailer are fixed in the usual manner against one of the surfaces of one of the front section main longitudinal beams 22, for example along the outer surface of the vertical web 24 of the lower or left hand beam 22 of FIG. 1, and extend to a location about midway between the forward and rearward limit positions of the front end portion of the rear section main beams, for example about 16 feet from the rearmost end of the front section 18. They then extend outwardly along one of the transverse I-beams 27 providing the support structure for the flat bed 12 to the outer edge channel member 28 at the side of the trailer nearest that main beam 22 and then extend downward along the inner surface of an outrigger support plate, indicated by the reference character 60, welded at its upper end to the channel member 28, where the air lines terminate at a pair of swivel mount assemblies 61, 62. Similarly, the electrical cable follows essentially the same path from the cab and terminates at an electrical plug fixtures 63 near the swivel mount assemblies. The swivel mount assemblies 61 and 62 are supported in the horizontal upper flange of an angle member support bracket 64 having a depending vertical flange welded against the inner surface of the outrigger support plate 60 carried by the front trailer section. The air lines extending to the cab are indicated by the reference characters 65 and 66 and extend outwardly from their supported positions alongside the outer surface of the web 24 of the front section main beam 22 and along opposite sides of the transverse I-beam 27 nearest the center of the outrigger plate 60 and then downwardly, as illustrated in FIG. 10, where they are joined by coupling fittings 61a, 62a of the swivel mount assemblies to the respective swivel mounts. The swivel mount assemblies 61 and 62 are fixed in apertures therefor near the opposite ends of the horizontal flange of the support bracket 64 as shown, by suitable mounting nuts, and include a conventional disconnect assembly, such as commercially available AIREQUIP disconnect assemblies, indicated at 61b and 62b, which incidentally have the capacity of permitting rotation of the lower end portion relative to the upper end portion about the axis of the disconnect, which is the vertical axis when installed as shown. The lower end of the disconnect assemblies 61b and 62b are joined to an elbow conduit section 61c, 61c, each of which are then connected at their lower ends to the ends of conventional "stretch coil" air hose sections, indicated at 67, 68, formed of spiral coils which are about 5 inches in diameter, of a type which is readily commercially available in the industry, and which has the characteristic of permitting the coils to readily stretch from about 3 ½ inches between turns to about 12 ½ inches between turns. For example, such stretch coil hoses or cables are available under the trademark PARFLEX manufactured by Parker-Hanifin Corp. If desired, the portions of the stretch coil hose sections 67, 68 may be covered with a wire sheath, indicated at 69, over the first 10 or 12 inches leading from the swivel mount assemblies 61, 62 to lend additional support to the stretch coil hose sections in that region.

The electrical cable leading from the cab, indicated by the reference character 70, also extends along and is fixed to the outer surface of the vertical web 24 of the front section main beam 22 adjacent the air lines 65, 66 and extends outwardly alongside the transverse I-beam 27 adjacent the air lines to the plug fixture 63. In the illustrated example, one of the plug components 71 is fixed in a diagonal brace plate 72 welded at its upper end to the transverse I-beam 27 nearest the center of the outrigger plate 60 and welded at its lower ends to the inwardly facing surface of the outrigger plate 60 as shown. A stretch coil electrical cable section 73 is connected to the electrical cable 70 at the plug fixture 63 and is supported at the outrigger plate 60 by an anchor cleat 74 fastened by suitable threaded nuts or the like to the bottom flange 60a extending inwardly from the bottom of the outrigger plate 60, with the portion of the electrical cable section 73 above the anchor cleat 74 extending in a loose coil upwardly along the inner surface of the outrigger plate 60 to the plug member 71a releasably coupled to the companion plug component 71 at the plug fixture 63 on the diagonal brace plate 72.

The longitudinal main beam 32 of the rear section nearest the side of the trailer opposite to the side carrying the outrigger plate 60 is provided with an outrigger assembly 76 which is formed of a box beam member 77 forming a supporting strut welded at its inner end to the bottom portion of the vertical web 34 of the rear section longitudinal main beam 32 and to the adjacent portion of the bottom flange 36 and extending horizontally outwardly to approximate vertical alinement with the outer edge of the front section trailer bed and its edge channel 28. At the outer end of the box beam member 77, an angle member support bracket 78, formed in the illustrated embodiment of two alined angle member sections 78a, 78b spaced a slight distance apart at its midregion and spanning a longitudinal distance comparable to that of the support bracket 64 is carried by the box beam member 77. As shown in FIG. 7 and 8, the box beam member carries an outrigger guard plate 79 disposed in a vertical plane substantially alined with the outer edge of the trailer bed and having an inwardly projecting bottom flange formation 79a. The two angle member sections of the support bracket 78 are welded to the guard plate 79 and adjacent portions of the box beam member 77 and are provided with apertures near the opposite end of the support bracket 78 in which are mounted swivel mount assemblies 61', 62' like the swivel mount assemblies 61 and 62 carried by the support bracket 64 at the opposite side of the trailer. The stretch coil hose sections 67, 68 are coupled at one end to the elbow portions 61c, 62c of the swivel mount assemblies 61, 62 associated with the outrigger support plate 60 and are coupled at their opposite ends to the elbow portions 61c', 62c' to the swivel mount assemblies 61', 62' associated with the outrigger assembly 76, to span a distance of about 12 feet when the trailer is in either the fully extended or the fully contracted position. In the illustrated embodiment, an elastic support cord 80 of rubber or similar material extends through the coils of each respective stretch coil hose section 67, 68, and through the stretch coil electrical cable section 73, and is mounted at opposite ends to members on the outrigger support plate assembly 60 and outrigger assembly 76 to minimize sagging of the stretch coil hose sections and electrical cable sections 67, 68, 73 over the approximately 12 foot span between the two outrigger assemblies. As shown in the illustrated embodiment, the end of the stretch coil electrical cable section 73 nearest the outrigger assembly 76 is fastened by an anchor cleat 81 carried on the bottom flange formation 79a of the guard plate 79 and curves upwardly through a cut-out, indicated at 77a, in the box beam member to extend through the hollow center of the box beam member 77, along with air hose sections 82, 83, and through an opening cut in the rear section main beam web 34 to a location immediately adjacent the inner surface of that main beam web 34, where the air lines or conduits 82, 83, and the electrical cable 84, interrupted if desired by another disconnect plug assembly, then extend alongside and are supported at intervals on the inner surface of the rear section main beam web 34 to the wheel assemblies and lights served by the electrical and air systems.

By suspension of the two stretch coil sections 67, 68 of the air line system and the stretch coil section 73 of the electrical cable system between the swivel mount assemblies 61, 62 and associated anchoring cleat 74 adjacent the left side edge 28a of the trailer and carried by the front section 18 and the swivel mount assemblies 61', 62' and anchor cleat 81 adjacent the right hand edge 28b of the trailer and carried by the outrigger beam 77 fixed to the rear section 19, the set of stretch coil sections 67, 68 and 73 are caused to shift through a fan shaped or V-shaped zone upon extension or contraction of the trailer sections from a position inclining rearwardly from the right hand edge 28b toward the left hand edge 28a in the contracted position shown in FIG. 1 to a position inclining forwardly from the right hand edge 28b toward the left hand edge 28a in the extended position shown in FIG. 2. When the trailer is length adjusted to any of the intermediate positions between the fully extended and fully contracted limit positions, the stretch coil sections 67, 68 and 73 assume angular positions between the two above-described limits. In this manner, assuming a trailer which is extensible over a range of about 24 feet, the left hand outrigger assembly associated with support plate 60 moves from a position about 12 feet to the rear of the companion outrigger assembly 76 to a position about 12 feet forward of the position of the outrigger assembly 76, and thus the range of extension and contraction of the stretch coil systems is only about 8 feet or less to accommodate the full range of longitudinal adjustment of the trailer and the stretch coils extend along a much sorter span between the swivel mount assemblies and anchor cleats at their ends than would be the case for stretch coils extending parallel to the longitudinal axis of the trailer and thus having to execute a range of extension of about 24 feet and a span of at least that length.

What is claimed is:

1. A longitudinally adjustable extensible trailer to be drawn by a truck tractor, comprising a main front frame section and a rear frame section telescopically interfitted with the front frame section, the front frame section adapted to have its front end supported by a truck tractor and the rear frame section having a wheel assembly carried thereby providing rear support for the trailer, the front frame section including a pair of longitudinal I-beams forming the main supporting beams therefor held in laterally spaced parallel relation, the rear frame section having a pair of longitudinal I-beams forming the main supporting beams therefor held in laterally spaced parallel relation located immediately inwardly of the pair of parallel I-beams of the front frame section forming companion pairs of relatively longitudinally movable I-beams, roller means carried on said I-beams of the front frame section and on said I-beams of the rear frame section disposed in rolling contact with the I-beams of the other frame section to allow relative longitudinal movement between the front and rear sections to permit lengthening and shortening of the trailer, manually operable locking means for locking the rear frame section against relative lonitudinal movement with respect to the front frame section at different length adjustment positions over a predetermined range of lengths between maximum and minimum length limit positions, an elongated floating safety locking bar extending through said longitudinal I-beams of said rear frame section supported thereby for axial sliding movement in A horizontal transverse position, said safety locking bar having a length corresponding closely to the spacing between the confronting vertical surface portions of the longitudinal I-beams of said front frame section and being captured in the longitudinal I-beams of the rear frame section by said surface portions of the I-beams of the front frame section, and front and rear stop members on the longitudinal I-beams of said front frame section extending toward the adjacent companion I-beams of the rear frame section and into the path of movement of the end portions of said floating safety locking bar when the front and rear frame sections are being lengthened or shortened to engage the end portions of the safety locking bar at said limit positions and prevent complete disengagement of the rear frame section from the front frame section.

2. An adjustable extensible trailer as defined in claim 1, wherein said floating safety locking bar is a bar of rectangular cross section, and said I-beams of said rear frame section having a pair of transversely aligned rectangular cross section openings corresponding to the cross section of said safety locking bar for slidably receiving the same therethrough to carry the safety locking bar in captured relation between the webs of said parallel I-beams of the front frame section.

3. An adjustable extensible trailer as defined in claim 1, wherein one of said longitudinal I-beams of the front frame section has an opening for insertion of the safety locking bar at the location it occupies when the trailer is adjusted to a length intermediate between said limit positions and displaced from said adjustment positions.

4. An adjustable extensible trailer as defined in claim 2, wherein one of said longitudinal I-beams of the front frame section has an opening for insertion of the safety locking bar at the location it occupies when the trailer is adjusted to a length intermediate between said limit positions and displaced from said adjustment positions.

5. An adjustable extensible trailer as defined in claim 2, wherein said floating safety locking bar and the openings therefor in the I-beams of said rear section are located between the uppermost flange of the I-beams of the rear frame section and the lowermost flange of the I-beams of the front frame section.

6. An adjustable extensible trailer as defined in claim 4, wherein said floating safety locking bar and the openings therefor in the I-beams of said rear frame section are located between the uppermost flange of the I-beams of the rear frame section and the lowermost flange of the I-beams of the front frame section.

7. An adjustable extensible trailer as defined in claim 2, wherein said longitudinal I-beams of said front and rear frame sections each have vertical webs held in parallel vertical planes relative to each other and have horizontal top and bottom flanges integral therewith, said openings for the safety locking bar in said longitudinal I-beams being located in said webs below the top flanges of the rear frame section I-beams.

8. An adjustable extensible trailer as defined in claim 4, wherein said longitudinal I-beams of said front and rear frame sections each have vertical webs held in parallel vertical planes relative to each other and have horizontal top and bottom flanges integral therewith, said openings for the safety locking bar in said longitudinal I-beams being located in said webs below the top flanges of the rear frame section I-beams.

9. A longitudinally adjustable extensible trailer to be drawn by a truck tractor, comprising a main front frame section and a rear frame section telescopically interfitted with the front frame section, the front frame section adapted to have its front end supported by a truck tractor and the rear frame section having a wheel assembly carried thereby providing rear support for the trailer, the front frame section including a pair of longitudinal main beams held in laterally spaced parallel relation, the rear frame section having a pair of longitudinal main beams held in laterally spaced parallel relation located immediately inwardly of companion ones of the pair of main beams of the front frame section, roller means carried on said main beams of the front frame section and on said main beams of the rear frame section disposed in rolling contact with the main beams of the other frame section to allow relative longitudinal movement between the front and rear sections to permit lengthening and shortening of the trailer, manually operable locking means for locking the rear frame section against relative movement with respect to the front frame section at different length adjustment positions over a predetermined range between maximum and minimum length limit positions, a plurality of communication lines providing electrical and air supply system circuits from the front to the rear of the trailer including a stretch coil section forming the intermediate portion of each of said communication lines, means for supporting said stretch coil section including a first mounting structure therefor in the form of an outrigger rigidly carried on one of the longitudinal main beams of one of said sections near one side edge of the trailer and a second mounting structure therefor carried by the other trailer section near the opposite side edge of the trailer, anchoring means on the end portions of the stretch coil sections at each of said mounting structures, the stretch coil sections being connected at their ends to said ahcoring means to extend in suspended relation between the first and second mounting structures generally crosswise of the trailer along substantially straight parallel horizontal axes at any of a plurality of angular positions occupying a predetermined V-shaped zone between a first limit position inclining from a first side edge of the trailer forwardly toward the opposite side edge and a second limit position inclining rearwardly from the first side edge toward the second side edge during variation of the length of the trailer, elongated supported cord members extending between the mounting structures through the coils of said stretch coil sections lending support to the stretch coil section, and fixed electrical and air hose conduits supported on each of the front and rear frame sections extending longitudinally thereof along predetermined portions of their length coupled to the ends of the stretch coil sections.

10. An adjustable extensible trailer as defined in claim 9, wherein said anchoring means at each of said mounting structures includes a pair of swivel conduit devices connected at one end to the fixed air hose conduits of one of the respective frame sections and having elbow members at the other end of each swivel conduit device coupled to an end of one of the stretch coil sections.

11. An adjustable extensible trailer as defined in claim 9, wherein the end portions of the stretch coil section for the electrical circuit are anchored to said mounting structures by anchor cleats fixing the same to the mounting structures.

12. An adjustable extensible trailer as defined in claim 10, wherein the end portions of the stretch coil section for the electrical circuit are anchored to said mounting structures by anchor cleats fixing the same to the mounting structures.

13. An adjustable extensible trailer as defined in claim 9, wherein said support cord members are elastic cords extending through the coils of the associated stretch coil sections and having loops at their ends secured to said mounting structures.

14. An adjustable extensible trailer as defined in claim 10, wherein said support cord members are elastic cords extending through the coils of the associated stretch coil sections and having loops at their ends secured to said swivel conduit devices of said mounting structures.

15. An adjustable extensible trailer as defined in claim 12, wherein said support cord members are elastic cords extending through the coils of the associated stretch coil sections and having loops at their ends secured to said swivel conduit devices and anchor cleats of said mounting structures.

16. An adjustable extensible trailer as defined in claim 9, wherein the trailer includes an elongated floating safety locking bar extending horizontally transversely through said pair of longitudinal main beams of said rear frame section supported in corresponding cross section openings therein for axial sliding movement and having a length corresponding closely to the spacing between predetermined confronting vertical surface portions of the pair of main beams of the front frame section and being captured by the latter in the openings of the front frame section main beams, and front and rear stop members on the front frame section main beams in the path of movement of end portions of the safety locking bar during lengthening or shortening of the trailer to engage the end portions of the safety locking bar at predetermined extension and contraction limit positions of the trailer and prevent complete disengagement of the front and rear trailer sections.

17. An adjustable extensible trailer as defined in claim 10, wherein the trailer includes an elongated floating safety locking bar extending horizontally transversely through said pair of longitudinal main beams of said rear frame section supported in corresponding cross section openings therein for axial sliding movement and having a length corresponding closely to the spacing between predetermined confronting vertical surface portions of the pair of main beams of the front frame section and being captured by the latter in the openings of the front frame section main beams, and front and rear stop members on the front frame section main beams in the path movement of end portions of the safety locking bar during lengthening or shortening of the trailer to engage the end portions of the safety locking bar at predetermined extension and contraction limit positions of the trailer and prevent complete disengagement of the front and rear trailer sections.

18. An adjustable extensible trailer as defined in claim 16, wherein the trailer includes an elongated floating safety locking bar extending horizontally transversely through said pair of longitudinal main beams of said rear frame section supported in corresponding cross section openings therein for axial sliding movement and having a length corresponding closely to the spacing between predetermined confronting vertical surface portions of the pair of main beams of the front frame section and being captured by the latter in the openings of the front frame section main beams, and front and rear stop members on the front frame section main beams in the path of movement of end portions of the safety locking bar during lengthening or shortening of the trailer to engage the end portions of the safety locking bar at predetermined extension and contraction limit positions of the trailer and prevent complete disengagement of the front and rear trailer sections.

19. An adjustable extensible trailer as defined in claim 16, wherein said floating safety locking bar is a bar of rectangular cross section, and said main beams of said rear frame section have a pair of transversely aligned rectangular cross section openings corresponding to the cross section of said safety locking bar for slidably receiving the same therethrough to carry the safety locking bar in captured relation between vertical webs of said parallel main beams of the front frame section, and one of said longitudinal main beams of the front frame section has an opening for insertion of the safety locking bar at the location it occupies when the trailer is adjusted to a length intermediate between said limit positions and displaced from said adjustment positions.

20. An adjustable extensible trailer as defined in claim 18, wherein said floating safety locking bar is a bar of rectangular cross section, and said main beams of said rear frame section have a pair of transversely aligned rectangular cross section openings corresponding to the cross section of said safety locking bar for slidably receiving the same therethrough to carry the safety locking bar in captured relation between vertical webs of said parallel main beams of the front frame section, and one of said longitudinal main beams of the front frame section has an opening for insertion of the safety locking bar at the location it occupies when the trailer is adjusted to a length intermediate between said limit positions and displaced from said adjustment positions.

* * * * *